United States Patent [19]
Debroche et al.

[11] Patent Number: 5,281,289
[45] Date of Patent: Jan. 25, 1994

[54] PROCESS FOR THE MANUFACTURING OF A TIRE AND MACHINES FOR THE CARRYING OUT OF THE PROCESS

[75] Inventors: Claude Debroche, Cebazat; Daniel Laurent, Meylan, both of France

[73] Assignee: Sedepro, Paris, France

[21] Appl. No.: 898,922

[22] Filed: Jun. 12, 1992

[30] Foreign Application Priority Data

Jun. 17, 1991 [FR] France ............... 91 07505

[51] Int. Cl.⁵ ............................................. B29D 30/10
[52] U.S. Cl. ..................................... 156/117; 156/121; 156/123; 156/397
[58] Field of Search ............... 156/117, 121, 123, 166, 156/177, 397

[56] References Cited

U.S. PATENT DOCUMENTS

| | | |
|---|---|---|
| 2,518,967 | 8/1950 | Witt ................................... 156/397 |
| 2,906,314 | 9/1959 | Trevaskis . |
| 3,057,396 | 10/1962 | Hanson .............................. 156/397 |
| 3,894,906 | 7/1975 | Pearce et al. ...................... 156/123 |
| 4,804,436 | 2/1989 | Debroche et al. . |
| 4,952,259 | 8/1990 | Debroche et al. . |

*Primary Examiner*—Michael W. Ball
*Assistant Examiner*—Richard Crispino
*Attorney, Agent, or Firm*—Brumbaugh, Graves, Donohue & Raymond

[57] ABSTRACT

The reinforcements for tires are made from a single cord (4) laid by a laying head (3A) which describes a path of any type surrounding the rigid core (2) which constitutes a rigid support on which the tire is progressively built. The path comprises a laying zone during which the laying head (3A) applies a length of cord. Between two successive passes of the laying head (3A), the rigid core (2) turns by an amount corresponding to the laying pitch.

14 Claims, 8 Drawing Sheets

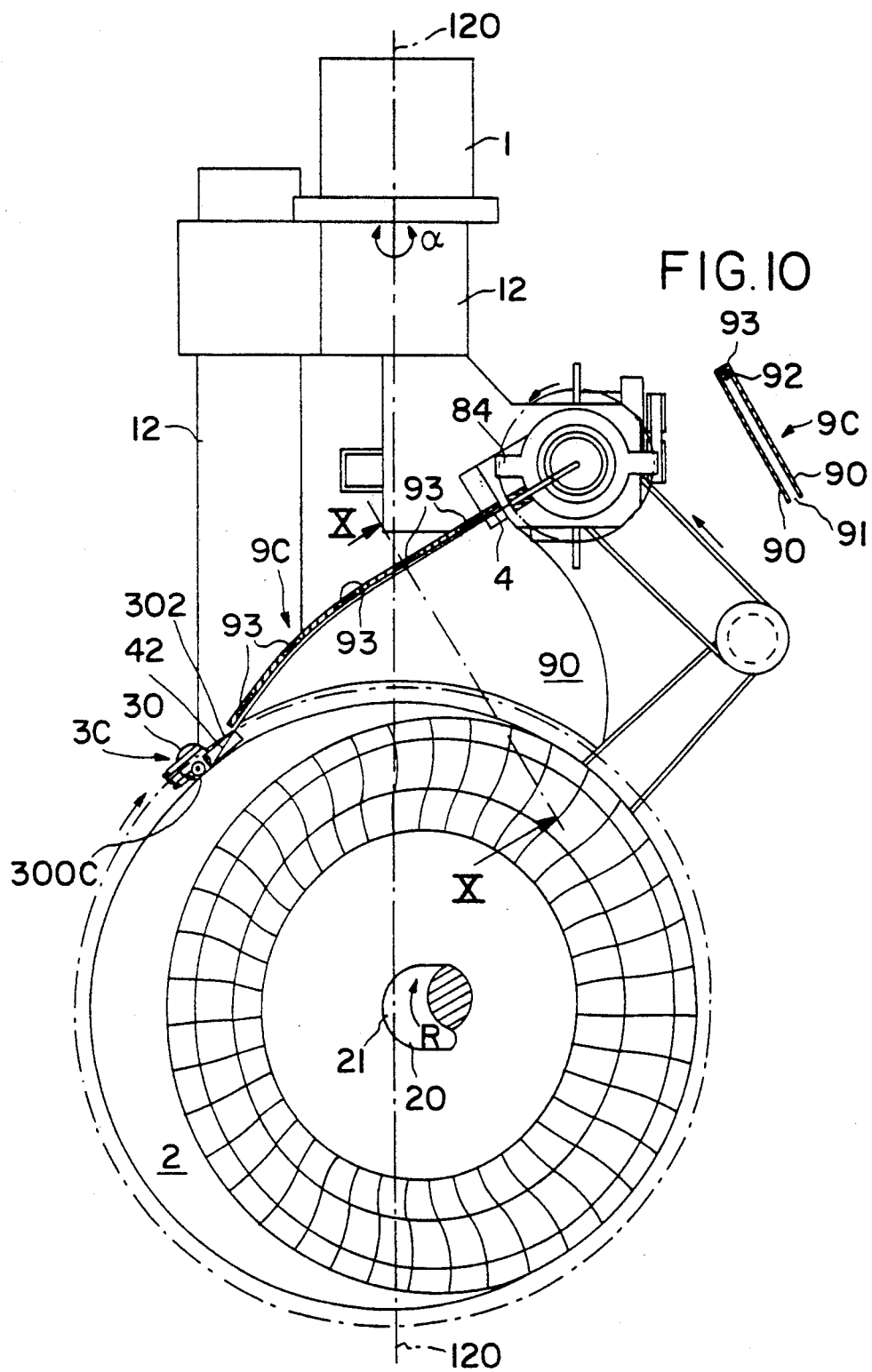

PROCESS FOR THE MANUFACTURING OF A TIRE AND MACHINES FOR THE CARRYING OUT OF THE PROCESS

BACKGROUND OF THE INVENTION

The present invention concerns the manufacture of tires. More precisely, it refers to the manufacture of reinforcement armatures which are found in belted tires and, in general, so-called radial carcass tires.

By "manufacture of a tire", there is understood complete manufacture or else partial manufacture comprising at least the reinforcements produced by the process which will be explained below, the manufactured tire, for example, having no tread.

U.S. Pat. No. 4,952,259 discloses a proposal for manufacturing such reinforcements no longer in the form of semi-finished products which are incorporated subsequently upon the assembly of the tire, but directly on the tire during the course of manufacture, and this from a single cord. This proposal, which is based on the projecting of a cord in the manner of a whiplash, makes it possible to cover the current angles of so-called crown plies. However, it permits the obtaining of small angles only with difficulty.

The teaching of said patent does not make it possible either to produce a carcass ply in which the cord extends continuously from one bead of the tire to the other.

The object of the present invention is to propose a method of manufacture which makes it possible to produce all crown reinforcements from a single cord, namely the reinforcements which are found below the tread, whatever the angle which the cords of these reinforcements form with respect to the median plane perpendicular to the axis of rotation of the tire. The expression "cord" is to be understood in a very broad sense, covering a single cord proper or a cable or equivalent assembly, and this whatever the material constituting the cord.

In accordance with the invention, the method of manufacture of a tire, at least one reinforcement of which is formed from a single cord, successive lengths of which are deposited on a rigid support defining the shape of the inner surface of the tire and on which all or part of the tire is progressively built, is characterized by the fact that:

the cord necessary to constitute a length is removed by cord feed means permitting the feeding of a given amount of cord intended to constitute a length, each successive length is laid by at least one laying head which describes an orbital path surrounding the support, said path comprising a laying zone for the length of cord, said orbital path being contained in a plane which intersects the axis of rotation of the support by an adjustable angle, the said support is imparted a rotary movement the angular speed of which depends on the angular speed of the laying head, the laying angle, the number of laying heads, and the laying pitch of the cords.

Two basic embodiments will be explained with machines which comprise a laying head describing a circular orbital path. The laying head can, in addition to its basic function, by its movement cause the feeding of the cord necessary or else the feeding of the cord and the presentation of a length in front of the laying head are assured by parts independent of the head.

The invention extends also to machines for the manufacture of tire reinforcement machines having a laying head capable of describing any suitable path of encirclement of the core around a rigid core, permitting the employment of this process. This rigid core constitutes the rigid support which defines the inner surface of the tire.

In general, such machines comprise:
a frame,
a displaceable rigid rotary core constituting said support,
unwinding means for removing the given quantity of cord necessary to constitute a length,
at least one laying head describing an orbital path around the core, said path comprising a laying zone and being contained within a plane which intersects the axis of rotation of the core along an adjustable angle,
drive means for the laying head or heads and means for the driving in rotation of the core, the speed of said latter means depending on the drive speed of the laying head or heads, their number and said angle, and on the pitch.

The following description, read in conjunction with the accompanying drawings, will make it possible better to understand the invention and to note all of its advantages.

DESCRIPTION OF DRAWINGS

FIG. 9 shows a third variant of the machine developed in accordance with the principles of the invention.

FIG. 10 is a section along the line X—X of FIG. 9.

DESCRIPTION OF PREFERRED EMBODIMENTS

The figures show the frame 1 of the machine, a displaceable rigid core 2 serving as support on which the tire is progressively built by the depositing thereon of rubber products and reinforcements as required by its architecture. The core 2 is rotatably mounted on the frame 1. Before application of reinforcement cords, the core 2 is covered with at least one layer of raw rubber. There can also be noted a laying head 3A or 3B or 3C mounted at the end of the curved arm 30.

Figure 7:
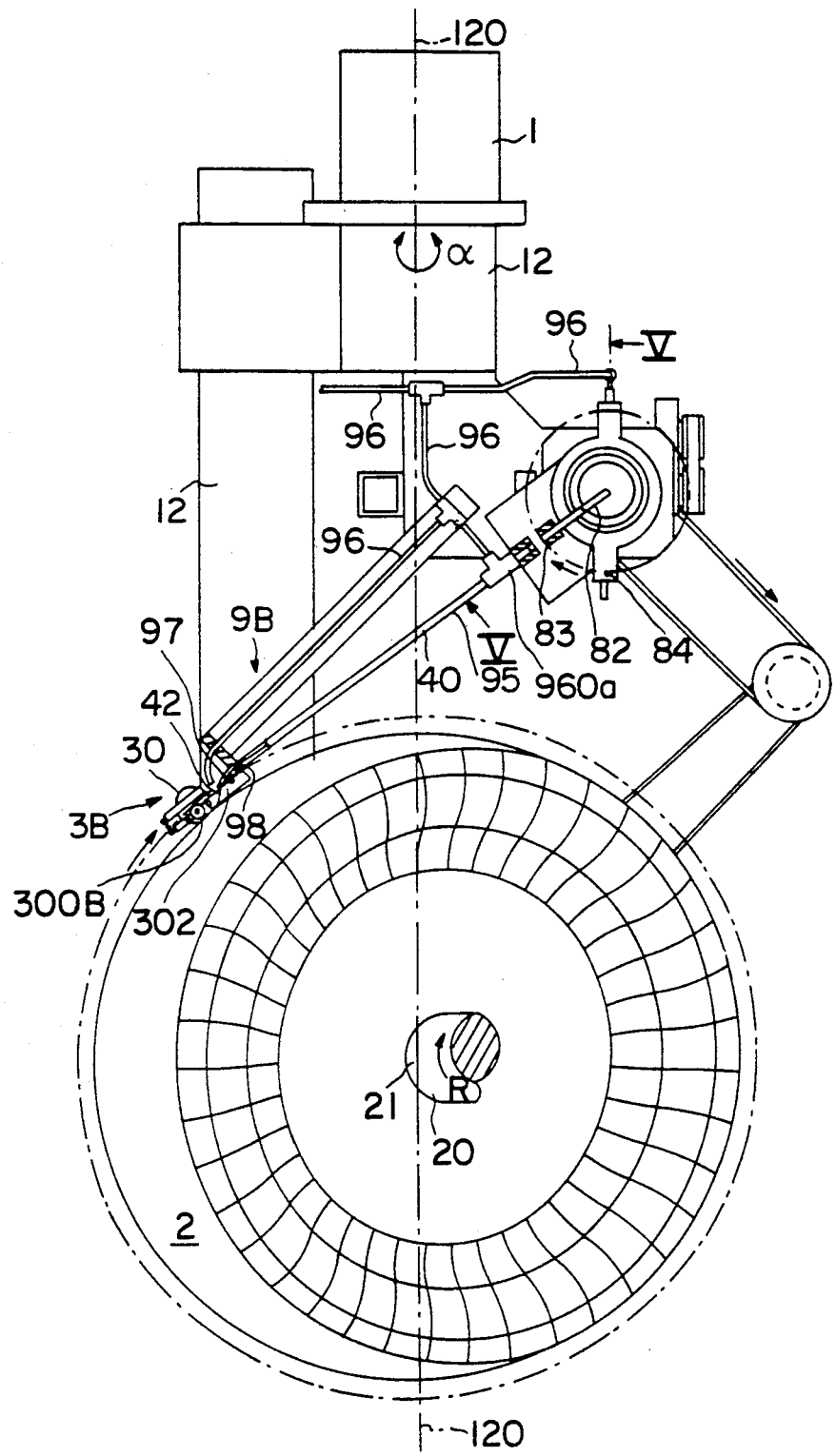
FIG. 7 is a side view of the second machine.
Figure 8:
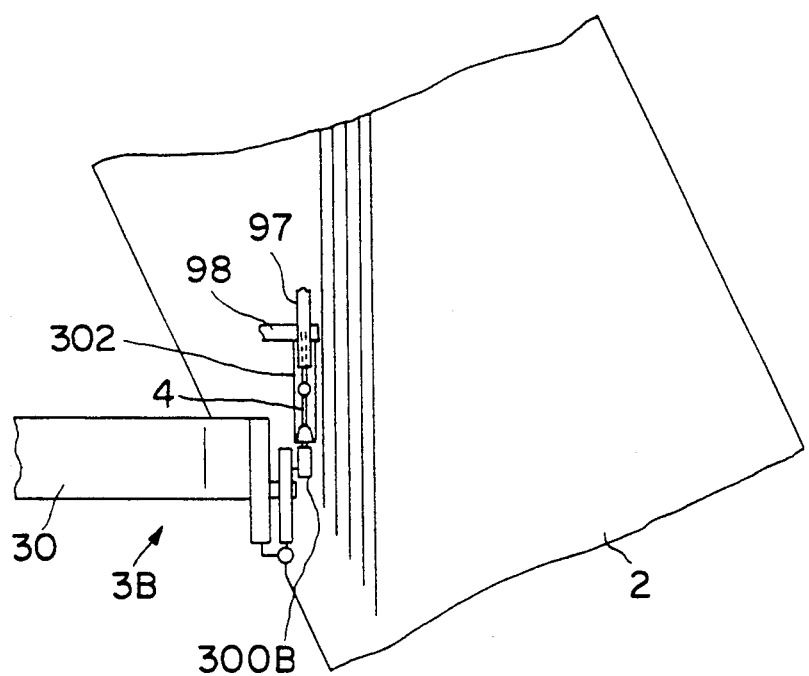
FIG. 8 illustrates a detail of this second machine.

In all variants, the laying head 3A or 3B or 3C describes a circular path which is contained within a plane, the orientation $\alpha$ of which with respect to the frame 1, and therefore with respect to the core 2, can be adjusted. For this purpose, the laying head 3A or 3B or 3C is supported by a cradle 12 articulated along the axis 120 with respect to the frame 1. The plane of this path corresponds to the plane of FIGS. 3, 7 and 9.

In all the Variants illustrating this description, the lengths of cord are pieces individually freed in succession by cord cutting means.

The first variant of the invention, illustrated in FIGS. 1 to 4, is characterized by the fact that the feeding of a given amount of cord is assured by the laying head 3A itself, while in the other two variants the feeding is effected independently of the laying head 3B or 3C.

The curved arm 30 is mounted at the end of a shaft 31, which is necessarily hollow in the first variant, fastened on the cradle 12 by means of the bearings 13. This arm 30 is driven in rotation by a motor 14 which drives the toothed pulley 32. The counterweight 33 makes it possible to assure the proper balancing thereof. The laying head 3A describes a circular path around the axis 39 when it is driven by said motor.

The machine is fed continuously with cord 4 by any suitable means. The cord 4 penetrates into the machine at a point fixed in space and therefore located on the axis of rotation of the curved arm 30, namely in the orifice 34. The cord is then guided by sliding in a tube made of two parts 35A and 35B, the first of which penetrates slightly into the second, in order to perform a function which will be explained subsequently. The tube 35A + 35B is hooked on one side of the curved arm 30, preferably the downstream side with respect to the direction of rotation of the arm 30. By "downstream side", there is understood the side towards which the curved arm 30 is directed during its rotation. The cord 4 is to emerge from the upstream side of the laying head 3A, that is to say at the rear with respect to the direction of rotation of the arm 30, and be immobilized whenever the laying head 3A enters into the laying zone.

Figure 2:
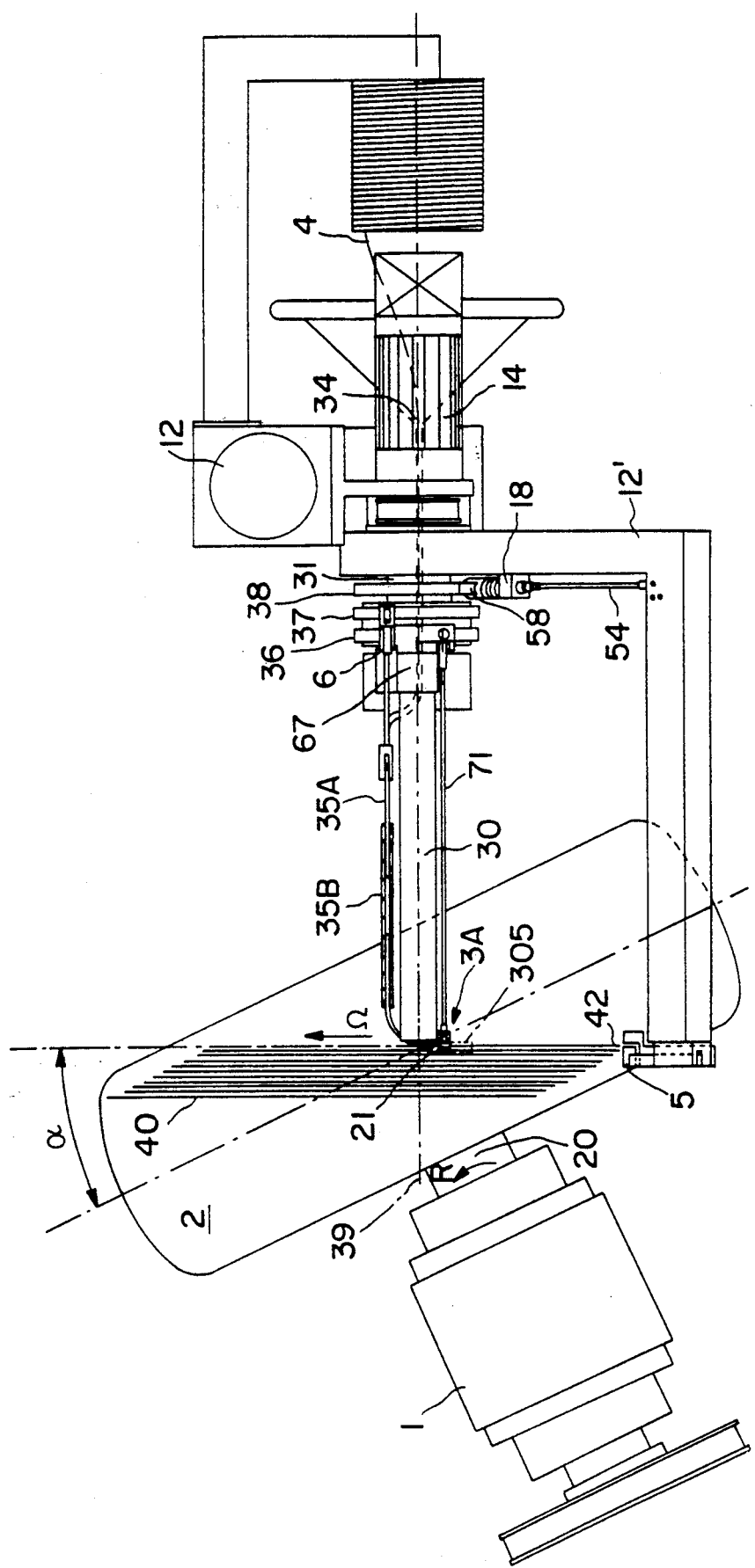
FIG. 2 is a section along the line II—II of FIG. 1.
Figure 3:
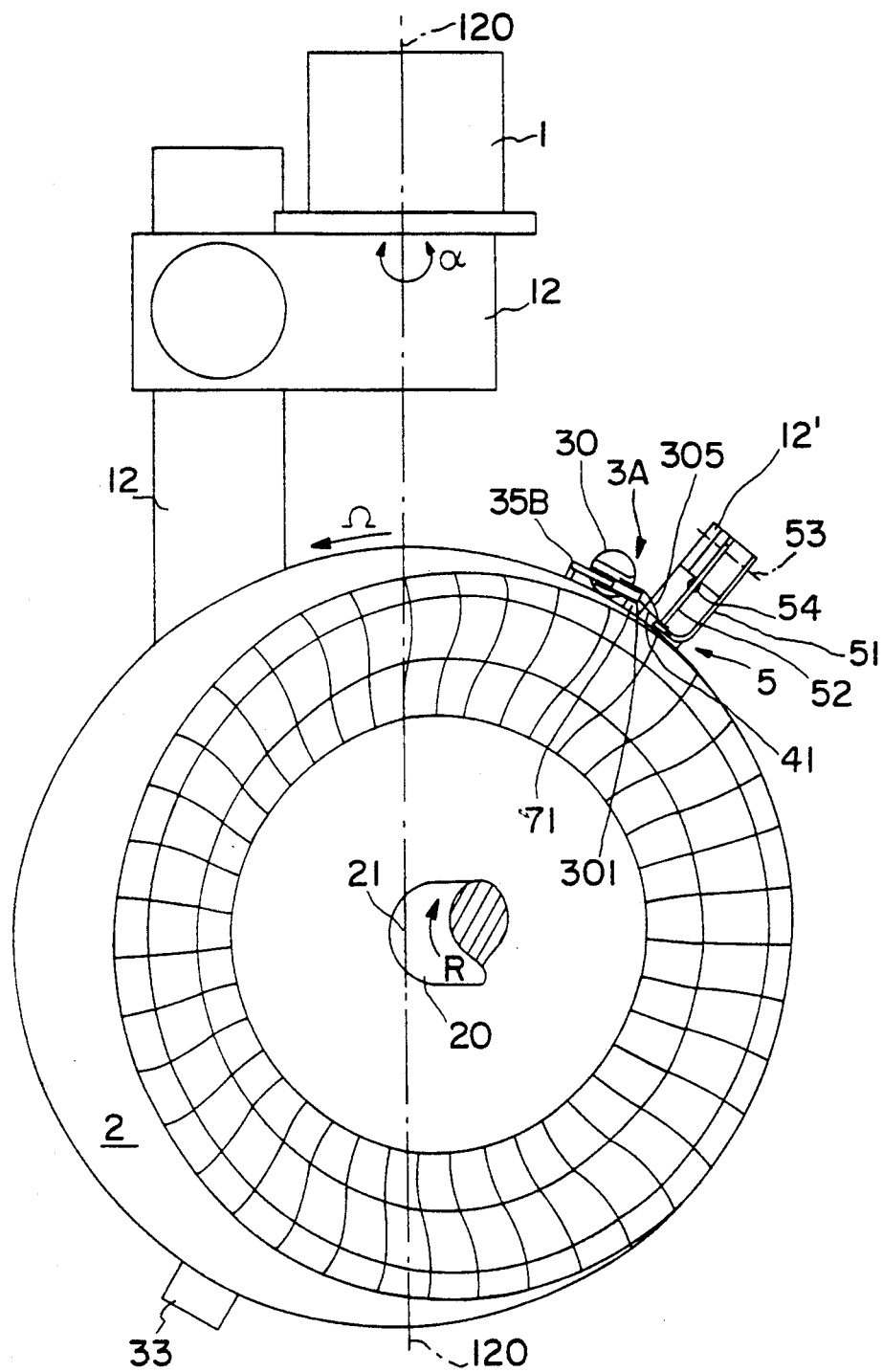
FIG. 3 is a side view of this machine.

The direction of movement of the laying head 3A indicated symbolically by an arrow $\Omega$ and the position of the tube 35B with respect to the direction of rotation will be noted (see, in particular, FIGS. 2 and 3). During its movement, the laying head 3A passes radially just above a clamp 5 which is mounted on the portion 12' of the cradle 12 and therefore fixed in space, in order to assure the immobilization of the cord. It is to be noted that there is concerned here merely a detail of execution; the immobilizing could also be obtained, for instance, by a fixed blade, that is to say a blade secured to the frame, and not by the laying head, pressing the cord against the core in order to apply it against the latter and therefore hold it.

Figure 1:
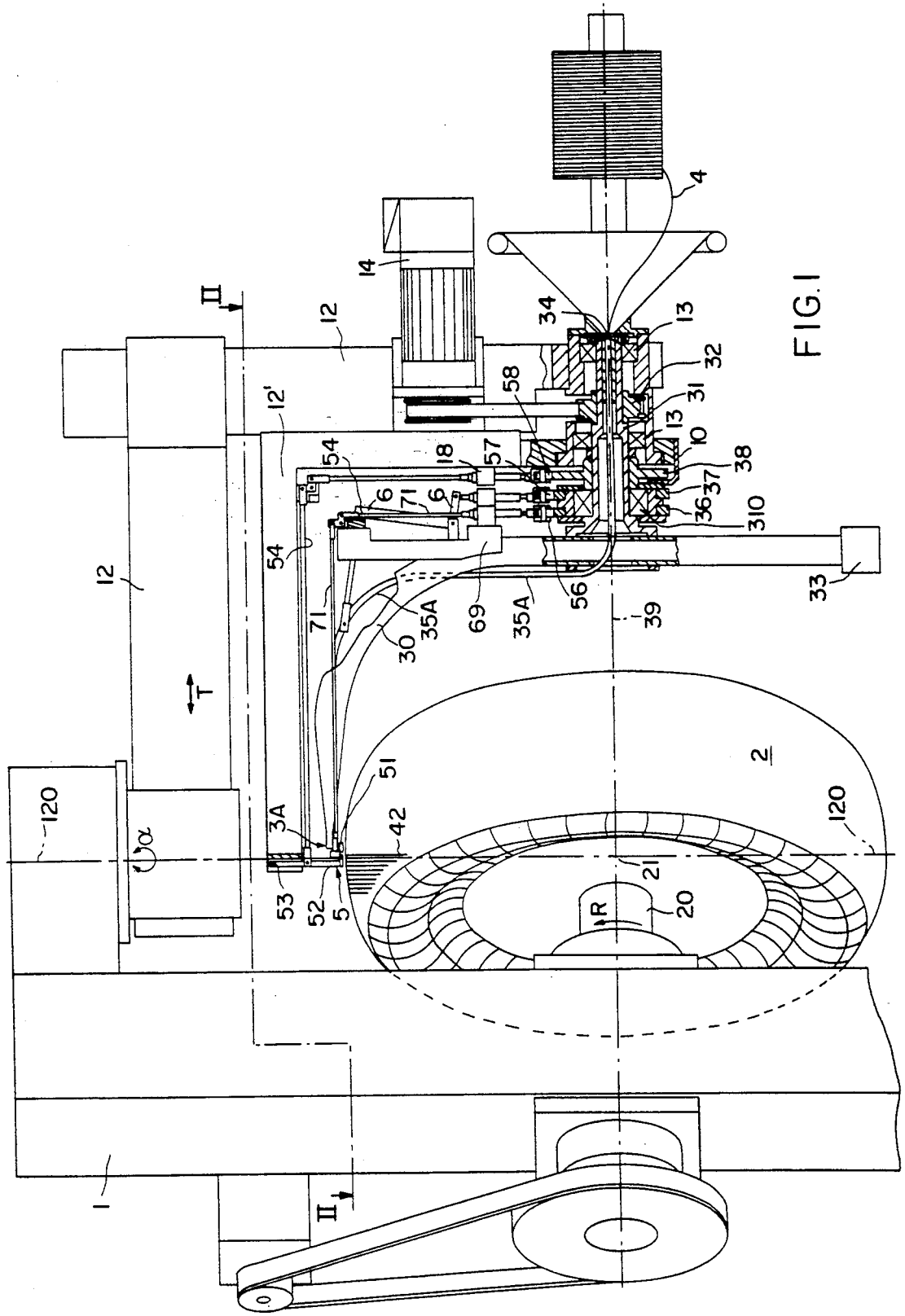
FIG. 1 is a view in elevation, partially in section, of a first variant of the machine, developed in accordance with the principle of the invention.

In order to clarify FIG. 1, the part 12' of the cradle 12 supporting the clamp 5 has been folded in the vertical plane in order to show the core. The actual position of said part 12' of the cradle 12 is that shown in FIGS. 2 and 3. Furthermore, the position of the laying head 3A is identical in FIGS. 1 and 2, while in FIG. 3 the laying head 3A is shown in a previous position.

A first jaw 51 of said clamp is fastened directly to the frame, while a second jaw 52 is articulated on said frame at 53 and driven by a rod 54. Just behind the outlet orifice 301 for the cord 4, there is arranged a small folding blade 305 which pushes the cord 4 radially downward sufficiently so that, when the laying head 3A has gone beyond the level of the clamp 5, the cord 4 is still between the jaws 51 and 52 of said clamp.

The moving together of the jaws 51 and 52, controlled in the manner which will be pointed out below, then makes it possible to immobilize the cord 4. The laying head 3A is then in the position shown in FIG. 3. The continuation of the movement of the laying head 3A causes the feeding of the amount of cord 4 necessary to lay a length of cord constituting the reinforcement. The cutting of the cord 4 is effected by a guillotine 7 driven by a rod 71. Furthermore, when the cord 4 has been cut at the end of the laying zone, the action of this folding blade 305 sees to it that the end of the length of cord is securely applied against the core.

In FIGS. 1 and 2, it is again seen that there are concentrically mounted around the shaft 31 three cams 36, 37, 38 which cooperate with the rollers 56, 57, 58, respectively. The cams 36 and 37 are stationary; they are therefore disconnected from the movement of rotation of the shaft 31 by the bearing 310 and are connected to the frame 1 by the lug 10. The rollers 56 and 57 associated with these cams are mounted on a support 67 which is integral with the curved arm 30 and are therefore driven in rotation by the latter. The cam 38 in its turn is fastened to the shaft 31 and turns with it, while the associated roller 58 is mounted on a support 18 integral with the frame 1; it is therefore not movable in rotation.

The rigid core 2 is mounted for rotation around its shaft 20, which is mounted on the frame 1. The cradle 12 can turn with respect to said frame 1 around the axis 120. The axis 20 and the axis 120 are secant to the median point 21 of the core 2. The movement of rotation around the axis 20 is indicated symbolically by the arrow R. The degree of freedom of rotation around the axis 120, indicated by $\alpha$, permits the adjustment of the core 2 with respect to the circular path described by the laying head 3A; it is the adjustment of the angle $\alpha$ at which it is desired to lay the crown reinforcement cords. It is possible to take the necessary measures so that this angle $\alpha$ is continuously variable, which allows the reinforcement cords to be placed along the non-linear paths. The curved arm 30 is dimensioned and shaped in such a manner that the laying head 3A, or more precisely the outlet orifice 301 of the cord 4, describes a circular path around the core 2 at a level just above the maximum radius of the core 2. The relative theoretical position of this circular path is such that the axis 39 intersects the axis 20 at the point 21. In practice, the axis 39 is preferably shifted slightly downward (as seen in FIGS. 1 and 2) with respect to the axis 20 in order to move the laying head 3A away from the core 2 on the side where cord is not laid.

Furthermore, the cradle 12 can preferably undergo translation with respect to the frame parallel to the axis 39, as indicated by the arrow T. This translation T and the rotation $\alpha$ permit all desired adjustments of the core 2 with respect to the path of the laying head 3A in order to be able to produce all desired crown reinforcements. The core 2, shown in solid lines in FIG. 2 and in perspective in FIG. 1, is adjusted in accordance with the angle selected. For instance a typical angle $\alpha$ for a crown reinforcement is about 25°. The curved arm 30 is shaped so that it always remains outside the sphere enveloping all possible positions of the core 2, while permitting the laying head 3A to reach the zenith of the core during its path. The laying zone of said path corresponds to the time when the laying head 3A is above the core 2 on the side on which the cord 4 is applied onto the core. The process does not comprise any real lower or upper limit for the angle $\alpha$. Of course, a time comes when the angle $\alpha$ is so small that one is compelled to combine the movement of rotation with a relative translation between the plane of rotation of the laying head and the core. These are considerations relative to the design of the tire rather than to the process.

It is even possible to produce a zero-degree reinforcement, as is found more and more frequently in tires bearing a speed index of HR or above, without having to have recourse to another laying machine, which is still another advantage of this invention, therefore making it possible to cover angles from zero to 90°.

If one produces a zero-degree crown reinforcement (more precisely, of very small angle corresponding to the laying pitch of a so-called "zero-degree" reinforcement) or, more generally, of small angle within the meaning of the preceding paragraph, then the laying can be effected by guidance, employing the translation T. Such a laying can be effected, for instance, by immobilizing the laying head 3A and causing the core 2 to turn in the proper direction. The angle of the orbital path is thus adjusted to zero degrees, and the small angle corresponding to the laying pitch of the length of cord is obtained by regulating the speed of translation T as a function of the speed of rotation of the core 2.

The operation of the machine in detail is as follows. The core 2 is imparted a movement of rotation R around its axis 20, the speed of which depends on the speed of rotation of the laying head 3A around its axis 39 and also on the angle α as a function of the laying pitch of the cord. Under the initial conditions, a piece 41 of cord 4 protrudes out of the outlet orifice 301 located behind the laying head 3A. As soon as the end 42 of the cord 4 has arrived at the height of the lateral limit desired for the crown reinforcement, it is immobilized by the clamp 5, actuated by the cam 38, via the rods 54. This is the start of the laying zone.

Figure 4:
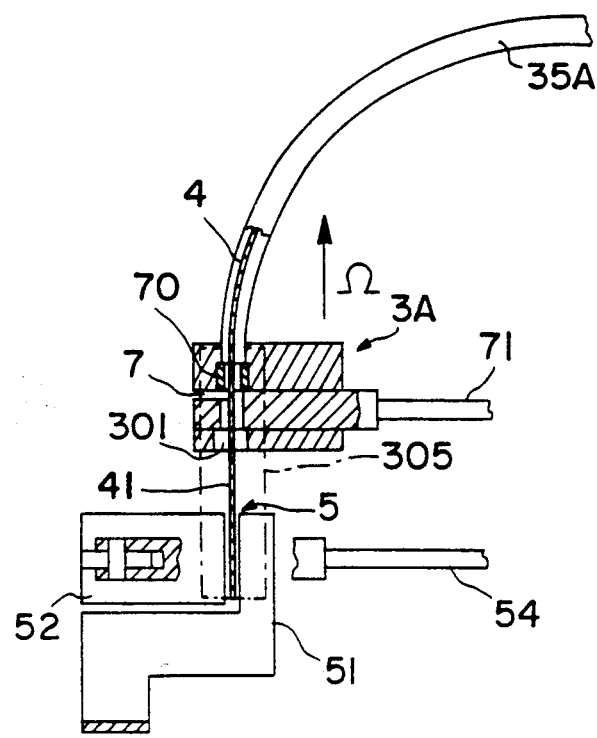
FIG. 4 shows a detail of the machine according to the first variant.

The continuation of the rotation of the laying head 3A causes the feeding of cord, which therefore passes through the tube 35A+35B. The cam 37 actuates the rocker 6, the end of which is attached to the part 35A of the tube, in order to increase the length of path of the cord introduced into the tubes 35A+35B, which remain inserted one within the other. When the laying head 3A arrives at the height of the other side edge desired for the crown reinforcement, the guillotine 7, actuated by the cam 36 via the rods 71, cuts the cord 4. In FIG. 4 there can be noted the blade of the guillotine 7, integral with the movement of the rod 71, and the sleeve 70 retaining the cord 4 so that it can be cut by the blade.

During the return phase, the cam 37 causes a decrease in the length of the path of the cord 4 in the tubes 35A+35B, then causing a new piece 41 of cord 4 of a given length to emerge from the orifice 301 of the laying head 3A so as to return the machine to its initial condition.

For perfect control of the initial conditions, it is advisable to install, on the path of the cord 4 a nonreturn device for the cord 4 (not shown) or to take some other equivalent measure.

The following variants employ elements of the first variant; said elements are designated by the same reference numerals in the figures and are not again described in detail. The specific parts of each of the second and third variants bear a specific reference numeral, and similar parts are designated by reference numerals bearing the identifier B or C, respectively. These second and third variants have the unwinding and cutting means in common.

Figure 5:
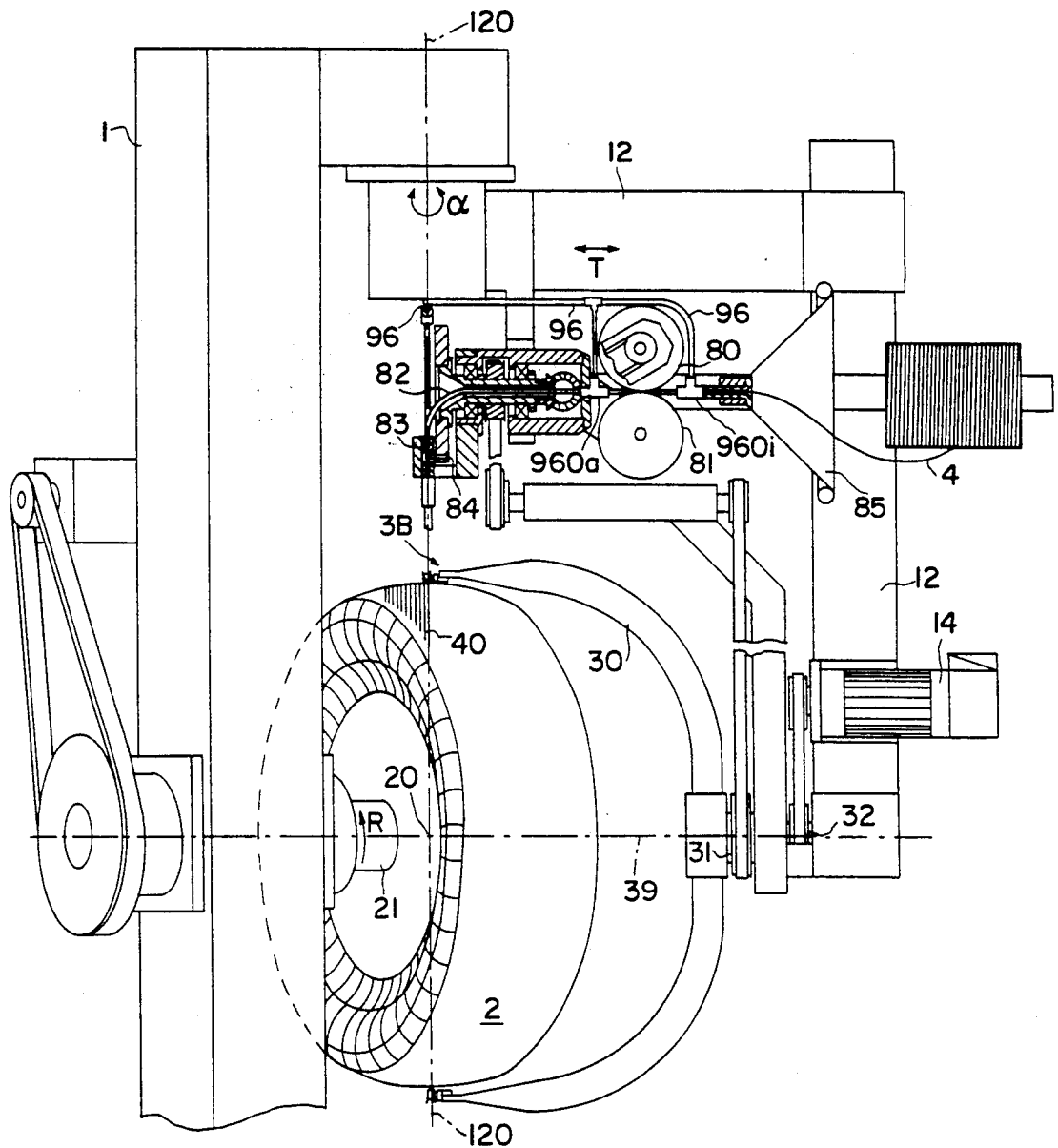
FIG. 5 is a view in elevation, partially in section, of a second variant, taken along the line V—V of FIG. 7.

In order to assure the unwinding, the cord 4 is clamped between two rollers 80, 81 covered by an antiskid covering (see FIG. 5). The rollers 80, 81 are driven in a manner which permits the feeding of cord 4 and the precise measurement of the amount fed. Any type of cord can be driven and measured in this way. All the movements of the machine can be connected by mechanical synchronization and in this case, knowledge of the amount fed is obtained from the number of revolutions of the drive and the step-down ratio installed.

The cord 4 is then introduced into a tube 82, the reinforced end of which constitutes a barrel 83 supporting the cord 4 when it is cut by the rotary knife 84. The actual position of the barrel in space is that shown in FIG. 7. The sectional view of FIG. 5 comprises a partial folding.

The lengths 40 of cord 4 to be placed on the core 2 to constitute the crown reinforcement are thus individualized by the cutting means. Each length of cord thus isolated is subjected to the action of the laying head 3B so as to assume its exact position on the core. The cutting means, formed in the examples illustrating the invention by a rotary knife 84, therefore act downstream of the unwinding rollers 80, 81 and upstream of a presentation device 9B or 9C the role of which is correctly to orient the cord 4, more precisely each length 40 of cord 4, with respect to the core 2 and to present it correctly to the laying head 3B or 3C so that the latter can lay it on the core 2.

A roller 300B or 300C mounted at the end of the arm 30 is the part applying the cord 4 onto the core 2. The role of the presentation devices 9B and 9C is therefore to feed the cord 4 properly centered with respect to the roller 300B or 300C, respectively, to feed it between the roller 300B or 300C and the core 2, and also to contribute to holding the cord 4 centered with respect to the roller 300B or 300C while the latter applies the cord 4 onto the core during the laying zone of the path of the laying head 3B or 3C.

Of course, the field of action of the laying head 3B or 3C must remain free. Therefore, there remains the space necessary for the displacement of the laying head 3B and 3C between the presentation device 9B and 9C, respectively, and the core 2, as can be clearly noted from FIGS. 7 and 9.

For recall, the axis of rotation 20 of the core 2 is fixed with respect to the frame 1 of the machine. The laying angle α of the cords 4 is obtained by the rotation of the cradle 12 supporting the laying head 3A or 3B or 3C around the axis 120. In other words, the angle α is obtained by the judicious presentation of the core 2 with respect to the path of the laying head 3A, 3B, 3C. The presentation device 9B or 9C is therefore itself fixed with respect to the path of the laying head; it is therefore integral with the cradle 12 supporting the laying head 3B or 3C.

FIGS. 5 to 8 illustrate a variant which, in the same way as the first variant, accepts both metal wires and textile threads. The presentation device is formed by a connecting piece 95 within which the cord slides, from its outlet from the barrel 83 u to above the start of the laying zone. The connecting piece 95 is separated from the barrel 83 by space just sufficient for the passage of the knife 84.

Figure 6:
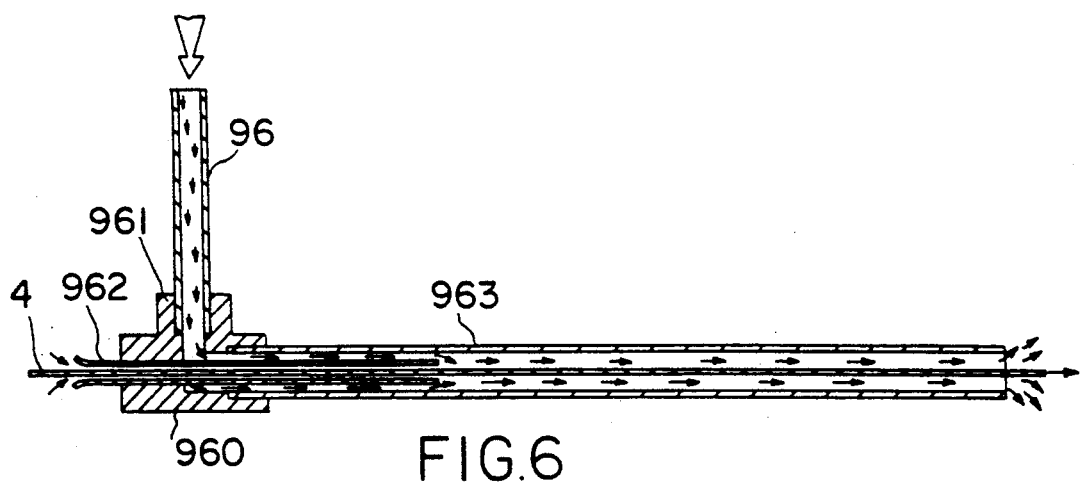
FIG. 6 shows a member used with this second variant.

Textile threads must necessarily be maintained taut by pneumatic propulsion. The principle of this pneumatic propulsion is illustrated in FIG. 6. The pneumatic propulsion is obtained within a tee 960 having a central branch 961 and two aligned branches 962 and 963. The central branch 961 receives the compressed air feed channel 96. It can be seen that the compressed air is expelled through the branch 963. By introducing the cord 4 through the branch 962 as soon as it leaves the branch 962, the compressed air tends to expel the cord 4 continuously out of branch 963.

There can be noted the channel 96 which conducts the compressed air to three places on the path of the cord 4. First of all, upstream of the unwinding rollers 80, 81 a reverse pneumatic propulsion 960i tends continuously to withdraw the cord 4 towards the rear so that, in case of the stoppage or reverse operation of the machine during, for instance, adjustment phases upon starting, the cord 4 always remains taut and does not accumulate between the flared tube 85 receiving the cord 4 and the unwinding rollers 80, 81. Downstream of the latter, there is a first propulsion in forward direction 960a, established at the start of the tube 82 conducting the cord 4 towards the barrel 83. It may be desirable to create losses in head by means of holes drilled through the tubes, downstream of all the front propulsors 960a, in order to obtain a good driving force for the cord 4. Finally, a second propulsion in forward direction 960a is located at the start of the connecting piece 95, which may also contain holes creating losses in head, about at the center thereof. A channel 96 feeds the air to a fourth place just at the end of the connecting piece 95.

A chute 302, fastened to the arm 30, forms part of the laying head 3B. It is machined in the solid or obtained by folding a metal sheet so as to obtain a receiving surface having the shape of a V, and is arranged in front of the roller 300B in such a manner that the bottom of the chute is substantially parallel to the core 2. This chute 302 can receive the end 42 of the cord 4, which makes it possible to tolerate a large amount of imprecision with regard to the position of presentation of the cord 4 in front of the roller 300B.

At the end of the connecting piece 95, there is established an outlet channel 97 which is slightly curved towards the core 2 so that the end 42 of the cord 4 comes against the bottom of the chute 302 with a angle of incidence of about 40°. In this way, said end 42 always presents itself between the core 2 and the roller 300B. There is no doubt that the shape of this outlet channel 97 and its direction with respect to the path of the laying head 3B are very important in order to achieve good precision and uniformity of laying, while the orientation of the connecting piece 95 is not the determining factor.

Just at the outlet of the channel 97, a small shaft 98 (see FIGS. 7 and 8) permits the cord 4 to form a progressive loop when the advance of the laying head 3B causes it to assume an S shape. The outlet channel 97 is split on the side facing the core up to the small shaft 98 so that the cord 4 can escape through said slit and rest against the shaft 98 so as to form the first loop of the S; the second loop of the S is determined by the resting of the cord 4 around the roller 300B. At this stage, the advance of the laying head 3B causes the feeding of the length 40 of cord 4 out of the channel 97 at a linear speed twice the linear speed of laying of the cord on the core 2. The cord 4 must be guided well, while maintaining as little friction as possible. It can be noted that, in this second variant, the entire length 40 of the cord 4 passes through the channel 97 and returns to the start of the laying zone before being sent again towards the end of the laying zone, while in the third variant it will be seen that the cord 4 never forms a loop, each length 40 being folded radially as a whole towards the core 2. In case of the use of a metal wire 4, the shaft 98 and the roller 300 must have a sufficient radius not to cause permanent deformation of the wire 4.

FIGS. 9 and 10 illustrate the third variant, designed specifically for laying metal wire 4. The presentation device 9C is formed by two parallel metal sheets 90 fastened to the cradle 12 and spaced apart by an amount slightly greater than the diameter of the wire 4. They are oriented radially with respect to the core 2 and arranged linearly so as to cut the core 2 along said laying angle α. It will be noted that the metal wire must be prepared in such a way that it can adhere to the raw rubber when it is applied to it. An example of such a preparation can be found in U.S. Pat. No. 4,952,259.

The sheets 90 laterally guide the cord 4 so as to hold it in a plane while its end 42 rejoins the start of the laying zone in order to be applied by the roller 300C on the one hand, and also, on the other hand, while the action of the roller 300C drives the length 40 of the cord 4 radially downward to place it on the core 2. The orientation of the barrel 83 is regulated as a function of the cord 4, so that the end 42 propelled forward by the rollers 80, 81 each time comes between the roller 300C and the core 2.

The movement of the rotary knife 84 is preferably such that it contributes to propelling the wire 4 towards the core 2 when the rotary knife 84 cuts it flush with the barrel 83.

The wire 4 is preferably held linear between the plates 90 by magnetic force. The enclosure 91 defined laterally by the plates 90 is closed towards the top by a closure 92 of non-magnetic material on which there are fastened several small magnets 93 constituting a magnetized ramp, which magnets attract the cord 4 sufficiently in order to hold it applied against the closure 92, and sufficiently little so that it can easily be torn off by the movement of the laying head 3C. The end 42 of the cord 4 can thus be brought in front of the roller 300C both precisely and reliably.

A chute 302, fastened to the arm 30, forms part of the laying head 3C. It forms a receiving surface having the shape of a V and is arranged in front of the roller 300C so that the bottom of the chute 302 is substantially parallel to the core 2. This chute 302 can receive the end 42 of the cord 4, which makes it possible to tolerate a large margin of imprecision in the position of presentation of the cord 4 in front of the roller 300C. In particular, there is a larger degree of imprecision of presentation of the cord 4 in front of the roller 300C when the magnetized ramp has not been provided along the closure 92. The barrel 83 is directed so that the end 42 of the cord 4 falls somewhat too far forward with respect to the roller 300C, so as to be certain that it never falls on top of the roller 300C or in the upper half thereof. The end of this chute 302 forms an orifice through which the cord penetrates.

In this embodiment of the invention, since the length 40 of the cord 4 is not independently propelled, the cord 4 must be applied to the core by the action of the roller 300C of the laying head 3C just before it is cut. In fact, the cutting of the cord abruptly stops the cord, even if for only a fraction of a second. Therefore, the continuation of the laying of the individualized length 40 would be entirely problematical, or even impossible. Upstream of the cut, the cord 4 which is propelled forcefully over the rollers 80 and 81 must find the space necessary to accumulate in the clearances present between the cord 4 and the guide or guides in which it is introduced.

According to the applications of the invention, it will easily be understood that it is necessary to adjust the phases of action of the different parts. Thus, for instance, it has just been seen that the roller of the laying head may act either before or after the cutting of the cord 4 forming a length 40.

Numerous modifications in reduction to practice can easily be adopted while remaining within the scope of the present invention. Thus, for instance, the last two variants described can easily be used with multiple laying heads all turning around the same axis 39, distributed uniformly over the path, which makes it possible to increase the rate of laying, or to decrease the speed of rotation of the laying heads for the same rate of laying. For current crown reinforcements, a length of cord is developed over an arc of less than 90° in the circumferential direction. One can therefore very easily place up to four laying heads 3B or 3C on the same axis of rotation 39 for a single presentation device 9B or 9C. Furthermore, in the case of variant B of the invention, the cord is accelerated to twice the average speed of feed of cord as soon as it is caught by the laying head 3B. The presentation device 9B therefore empties twice as fast. Provided that the presentation device 9B is doubled, subject to retaining a common outlet channel 37, it is possible to provide up to eight laying heads 3B on the same axis of rotation 39. In order to use several laying heads with the first variant, it is necessary to place in rotation with the laying heads as many feed bobbins as there are laying heads.

Of course, the machines carrying out the process of the invention may easily be "multi-dimensional", that is to say, capable of manufacturing tires of different sizes, both in diameter at the crown and in width; in this case, the arm 30 must be adjustable, as well as everything which cooperates with the arm at the level of the laying zone, such as, for instance, the presentation devices.

One can also contemplate laying several cords at the same time, or else cords of a different kind. It is very easy for the path of the cord, once placed on the core, not to be linear. For this, without in any way changing the mechanisms for the feeding and laying of the cord which have been described, in particular by maintaining a circular path for the laying head, it is sufficient to displace the core suitably while the head is in the phase of laying a length of cord. To the rotary movement of the core on itself, there is added a movement of translation along the shaft 20, or of rotation around the axis 120, or a combination of these two movements, or else the core is inclined with respect to its axis of rotation 20. More generally, suitable relative movements of the laying head with respect to the core are imparted.

We claim:

1. A process for the manufacture of a tire having at least one reinforcement formed a single cord (4) wherein successive discrete, cut lengths (40) of cord are deposited on a surface of a rotary driven rigid tire support core, said core defining the shape of the inner surface of the tire and on which all or part of the tire is progressively built, the process comprising:

feeding by feed means an amount of the cord necessary to form a length (40) of cord for deposit on the core;

laying discrete, cut lengths (40) of cord on the rotary core utilizing at least one laying head (3A, 3B or 3C) movable in an orbital path surrounding the support core, the said path including a laying zone defined by the cut length (40) of cord deposited on the core, said orbital path taking place in a plane which intersects the axis of rotation of the support along an adjustable angle, cutting said discrete length defining the laying zone, the length of cord being adhered to the surface of the core to which it has been applied;

imparting a rotary movement to said support core, the angular speed of which depends on the angular speed of the laying head, the laying angle, the number of laying heads and the laying pitch of the cords.

2. A process according to claim 1 in which the cord is fed by the laying head (3A) which includes, at its rear with respect to its movement, an orifice for the outlet of the cord, and in which the feed means works in conjunction with an immobilizing means fixed in space, arranged on the path at the beginning of the laying zone, immobilizing the cord so that the continuation of the movement of the laying head causes the feeding of cord, and cutting a length (40) of cord by cutting means located on the laying head, in order to cut the cord when the selected discrete, cut length of cord is reached.

3. A process according to claim 1, in which the feed means are independent of the laying head (3B or 3C), and in which the feed means assure the feeding of the cord and the measurement of the quantity fed, introducing the cord into a presentation device (9B or 9C) forming the desired angle with respect to the support, removing a length of cord by cutting means acting to cut the cord when a given length has been introduced into the said presentation device (9B or 9C), and applying the length (40) of cord on the support core by the said laying head (3B or 3C).

4. A machine for the manufacture of a tire reinforcement said reinforcement being formed a single cord (4) wherein successive, discrete, cut lengths (40) of said cord are deposited on a rotary driven rigid tire support core, said core defining the shape of the inner surface of a tire and on which all or part of a tire is progressively built, the machine comprising:

a frame (1), a displaceable, rotary driven rigid tire support core (2), unwinding means for removing a given amount of cord necessary to cut a discrete length (40), at least one laying head movable in an orbital path surrounding the core (2) for laying discrete, cut lengths of cord on the core, the said path including a laying zone defined by the cut length of cord deposited on the core, said path occurring within a plane which intersects the axis of rotation of the core (2) at an adjustable angle, means for cutting said discrete lengths of cord defining the laying zone, drive means for the laying head or heads and drive means for rotating the core, the angular speed of the latter depending on the angular speed of drive of the laying head or heads, their number, the said angle, and the laying pitch of the cords.

5. A machine according to claim 4, in which said path is circular, the axis of rotation of the head (3A, 3B or 3C) intersecting the axis of the core (2), and in which the path has a radius just larger than the maximum radius of the core (2).

6. A machine according to claim 5 in which the cord (4) is fed by the laying head (3A) itself, the laying head including an outlet orifice (301) for the cord at its rear with respect to its movement which works in conjunction with the unwinding means, said unwinding means comprising an immobilizing clamp (5) fastened on the frame in the vicinity of the place where the laying head (3A) enters into the laying zone, the said clamp immobilizing the cord when an end of the cord reaches the laying zone, so that the continuation of the movement of the laying head causes the feeding of cord and each length is individualized by cutting means formed of a guillotine (7) arranged on the laying head (3A).

7. A machine according to claim 6, comprising an extraction device for moving a given length of cord out of the laying head while the latter is in a return zone defined by the portion of the orbital path which is not part of the laying zone.

8. A machine according to claim 7, comprising
a first cam (36) assuring the drive of the guillotine (7),
a second cam (38) assuring the drive of the clamp (5),
a third cam (37) assuring the drive of the extraction device,
all the cams being arranged on the axis of rotation of the said laying head (3), the first and third cams (36, 37) being stationary, the second cam (38) being rotatable with the laying head.

9. A machine according to claim 4 in which the cord is presented to the laying head (3B or 3C) by parts distinct from the latter, the unwinding means including two rollers (80, 81) between which the cord is clamped and driving means for at least one roller, the driving of at least one roller permitting the feeding of the cord and the measurement of the amount fed, said machine including a presentation device (9B or 9C) forming the desired angle with respect to the core (2), and
cord cutting means including a rotary knife (84) mounted on the frame (1) between the unwinding rollers (80, 81) and the presentation device (9B or 9C).

10. A machine according to claim 9, in which the presentation device (9C) includes an enclosure defined by two parallel metal sheets (90) spaced apart by an amount slightly greater than the diameter of the cord and arranged radially with respect to the core (2) and forming the said laying angle, and including a barrel (83) facing the start of the laying zone on the core (2) for introducing the cord between the sheets, and in which the rotary knife (84) cuts the cord (4) upon emergence from the barrel (83) by a movement directed towards the core.

11. A machine according to claim 10, in which the enclosure is defined radially upward by a magnetized linear ramp (92) arranged parallel to the path of the cord emerging from the barrel (83) and radially above the latter.

12. A machine according to claim 9, in which the presentation device (9B) includes a tube (95) arranged substantially on a tangent to the core (2), and including a barrel (83) which faces the start of the laying zone on the core (2) for introducing the cord into the tube, and in which the rotary knife cuts the cord (4) after it passes through the barrel (83).

13. A machine according to claim 12, in which the laying head (3B) comprises:
a cute (302) for receiving an end of the cord,
an application roller (300B), and in which a resting shaft for the cord is provided at the outlet of the tube (95).

14. A machine according to claim 4, in which the plane in which the path of the laying head is contained is adjustable in translation with respect to the core.

* * * * *

UNITED STATES PATENT AND TRADEMARK OFFICE
CERTIFICATE OF CORRECTION

PATENT NO. :    5,281,289

DATED      :    January 25, 1994

INVENTOR(S) :   Debroche et al.

It is certified that error appears in the above-identified patent and that said Letters Patent is hereby corrected as shown below:

Col. 6, line 57, "u" should read --up--

Col. 7, line 39, "a" should read --an--

Col. 12, line 28, "cute" should read --chute--

Signed and Sealed this

Thirteenth Day of September, 1994

Attest:

BRUCE LEHMAN

*Attesting Officer*     *Commissioner of Patents and Trademarks*